United States Patent [19]

House et al.

[11] 3,898,431

[45] Aug. 5, 1975

[54] TUBULAR ELECTRIC HEATER WITH A THERMOCOUPLE ASSEMBLY

[75] Inventors: R. Kingsley House, Idaho Falls; David E. Williams, Hamer, both of Idaho

[73] Assignee: The United States of America as represented by the United States Atomic Energy Commission, Washington, D.C.

[22] Filed: Jan. 29, 1974

[21] Appl. No.: 438,149

[52] U.S. Cl. ............... 219/534; 73/341; 13/233; 219/471; 219/328; 219/494; 219/544
[51] Int. Cl. ............................................. H05b 3/40
[58] Field of Search ........... 219/328, 469, 470, 471, 219/494, 534, 544, 552, 553; 13/20, 22, 24, 25; 73/341, 359; 136/200, 201, 204, 230, 231, 232, 233; 338/23

[56] References Cited
UNITED STATES PATENTS

| | | | |
|---|---|---|---|
| 3,129,056 | 4/1964 | Muir | 136/201 X |
| 3,229,358 | 1/1966 | Scadron et al. | 219/534 X |
| 3,286,081 | 11/1966 | Scowcroft | 219/470 |
| 3,338,752 | 8/1967 | Finney | 136/233 |
| 3,414,711 | 12/1968 | Guyet et al. | 219/469 |
| 3,476,916 | 11/1969 | La Van | 219/552 |
| 3,492,170 | 1/1970 | Davis et al. | 136/233 |
| 3,607,447 | 9/1971 | Davis et al. | 136/233 |
| 3,614,387 | 10/1971 | Wrob et al. | 219/328 |

*Primary Examiner*—Volodymyr Y. Mayewsky
*Attorney, Agent, or Firm*—John A. Horan; Arthur A. Churm; Hugh W. Glenn

[57] ABSTRACT

A thermocouple or other instrumentation is installed within the walls of a tubular sheath surrounding a process device such as an electric heater. The sheath comprises two concentric tubes, one or both of which have a longitudinal, concave crease facing the other tube. The thermocouple is fixedly positioned within the crease and the outer tube is mechanically reduced to form an interference fit onto the inner tube.

6 Claims, 5 Drawing Figures

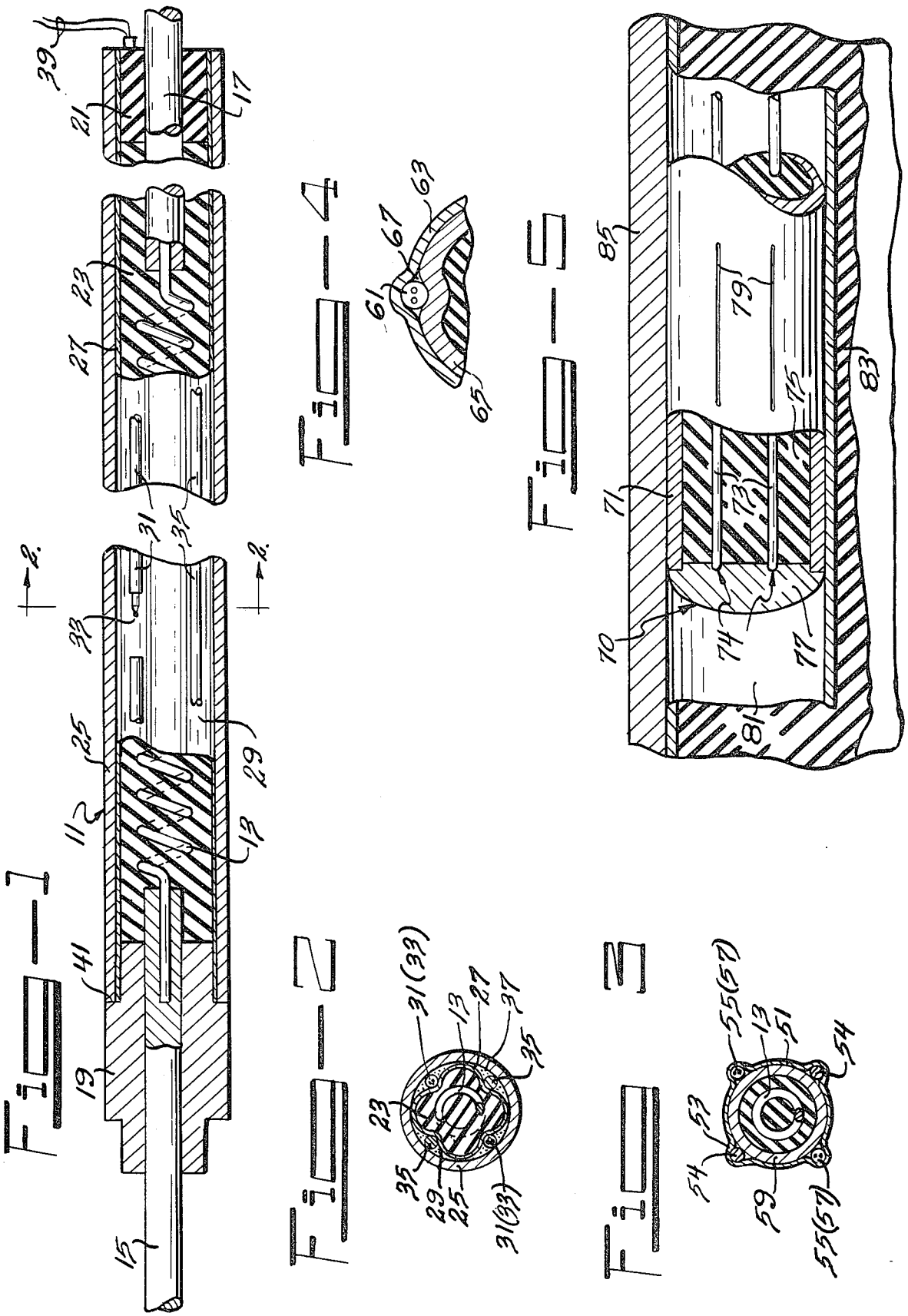

TUBULAR ELECTRIC HEATER WITH A THERMOCOUPLE ASSEMBLY

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to the positioning of instrumentation within tubular sheaths or jackets for monitoring a process. It is particularly applicable to the installation of thermocouples within the sheath of electric heaters used to simulate nuclear fuel elements.

Electric heaters of this type will normally comprise an elongated outer sheath, a centrally located resistance element connected to an external electrical supply for the generation of heat and an electrical insulative material encompassing the resistance element within the sheath. Since these heaters are often used as simulated fuel elements within reactor development projects, it is often desirable to monitor the temperature at the sheath walls in contact with a simulated reactor coolant. To do this, thermocouples have been attached by welding or other means to both the external and internal walls of the sheath. In other prior work, the thermocouples have been embedded within the electrical insulative material between the sheath wall and the resistive element.

A number of disadvantages have appeared in respect to these prior methods. It is difficult to accurately locate a thermocouple within the electrical insulation. Consequently the temperature data derived is in doubt, particularly in respect to the predicted temperature at the sheath or cladding. Other thermocouples installed on the outside of the sheath are greatly affected by the coolant and may be damaged or broken loose in handling procedures. Grooves cut in the sheath wall to protect the thermocouple cable have weakened the sheath resulting in its failure. On the other hand, the installation of the thermocouple on the internal walls of the sheath is a difficult process. In order to weld to the I.D. of a small-diameter tube, circular buttons have been cut from the tube wall and the thermocouple either welded to these buttons or to the opposite wall of the tube. The sheath is weakened and many have failed under high-temperature test conditions after welding the buttons back into the sheath wall.

Therefore, in view of the shortcomings of the prior art, the inventors have devised an integral-wall sheath having a thermocouple accurately positioned within the wall. The application of this development to simulated, reactor fuel elements is specified in RDT Standard P4-4T, February 1973, Division of Reactor Development and Technology, USAEC.

SUMMARY OF THE INVENTION

It is the object of the present invention to provide a sheath having instrumentation at a known location within the sheath wall.

It is also an object to provide an electric heater for simulating a nuclear fuel element with accurately located instrumentation for sensing temperature.

It is a further object to provide a method of accurately and fixedly positioning temperature instrumentation within a sheath.

In accordance with the present invention, an elongated sheath including temperature instrumentation encloses an electric heater device to simulate a nuclear fuel element. The sheath comprises a first tube having a longitudinal crease with both a concave and a convex face. Temperature instrumentation is fixedly positioned adjacent to the concave face. A second tube is disposed in a concentric fit with the first tube so as to face the concave surface of the crease. The two tubes are mechanically reduced in diameter to form an integral sheath having within the wall thereof a longitudinal interstice containing the instrumentation.

BRIEF DESCRIPTION OF THE DRAWINGS

The present invention is illustrated in the accompanying drawings wherein:

FIG. 1 is a side sectional view of an electric heater having thermocouple instrumentation within the heater sheath;

FIG. 2 is a cross-sectional view of the heater in FIG. 1 along lines 2—2;

FIG. 3 is a cross-sectional view of a sheath showing an alternate embodiment of the invention.

FIG. 4 is a fragmentary view of a sheath portion illustrating another modification in construction;

FIG. 5 is an enlarged fragmentary view of alternate instrumentation disposed within a sheath of the type shown in FIGS. 1 and 2.

DETAILED DESCRIPTION OF THE PREFERRED EMBODIMENT

Referring to FIGS. 1 and 2, an electric heater is shown having an elongated sheath 11 enclosing an axial resistance element 13. Resistance element 13 extends between two terminals 15 and 17 that project endwise from the sheath 11. Terminal 15 is affixed within a grounding plug 19 that is sealingly positioned within one end of sheath 11. Ordinarily, terminal 15, grounding plug 19 and sheath 11 will be welded together in order to seal that one end of the sheath. Terminal 17 at the opposite end of element 13 is electrically insulated from sheath 11 by a moisture seal 21 and by an electrically insulative filler material 23.

The heater as thus described is constructed of materials capable of withstanding high temperatures when used to simulate a nuclear fuel element. Temperatures of 500°F. to 1,500°F. may be encountered. To do this and to meet other purposes of the heater, sheath 11 is constructed of such a material that is mechanically workable, for example, zircaloy or a suitable stainless steel alloy. The electrical terminals are of an electrically conductive material such as Inconel or copper, while the heater resistance element is of a high-temperature alloy, for instance, copper-nickel, nickel-chromium, platinum-tungsten or similar alloys. Boron nitride has been found to be a suitable electrically insulative material 23, but to prevent moisture from impairing its insulative qualities, a moisture seal 21 such as one of mica paper is positioned around terminal 17 at the one open end of the heater.

Heater sheath 11 is composed of two concentric tubes 25 and 27. The inner tube 27 is shown having four longitudinal creases 29 equally spaced around the tube's perimeter. Within each crease is disposed a thermocouple cable 31 that terminates with a thermocouple junction 33. The thermocouple cables will, for example, comprise a pair of Alumel-Chromel conductors enclosed in MgO insulation and a metallic protective jacket. Such cables are readily available through commercial services. The junctions 33 and the cable jackets are fixedly attached as by laser welding to the outside wall surface of inner tube 27 and are disposed at different positions along the tube length when a lengthwise temperature profile is desired. In order to facilitate the creasing operation and to position the thermocouple close to the internal sheath wall, the inner tube is provided with a thinner wall than the outer tube, as an example, a 0.4 inch diameter tube with 0.01 wall thickness could be selected for use as the inner tube. The portion of each crease 29 that is not occupied by a thermocouple cable 31 is filled for structural strength with a stainless steel or other metallic wire 35. Small diameter filler wires 37 (FIG. 2) can be laid alongside wire 35 as well as along thermocouple cables 31 to fill in the voids along the edges of the crease. The thermocouple cables extend outwardly through the open end of the sheath opposite the grounding plug. The free leads 39 of the cable 31 can thereby be connected to a temperature-monitoring device (not shown).

The outer tube or wall 25 is mechanically bonded in an interference fit over the inner tube 27 with the thermocouple cables in place to form a composite but integral sheath around the heater resistance unit 13. Ground plug 19 is provided with a shoulder 41 for abutting the end surfaces of both the outer and inner tubes 25 and 27. By welding or otherwise sealing the end surfaces of the sheath to shoulder 41, one end of the crease or interstice between tubes 25 and 27, is closed. The opposite end remains open for thermocouple access, as described.

In one manner of forming sheath 11 of the electric heater shown in FIGS. 1 and 2, inner tube 27 is selected of a size to be a slight clearance fit when placed within outer tube 25. For example, a diameter clearance of 10 thousandths of an inch within ¼ to ½ inch tubes should be sufficient. Prior to assembly, the inner tube 27 is creased along its length by drawing the tube through a die having suitable inward protrusions to form the creases. A typical crease of 0.02 to 0.04 inch is sufficient for small diameter thermocouple cables. Where substantially deeper creases are made, it may be desirable to make several passes through the die with annealing steps between drawing steps. The thermocouple cables are positioned within the creases of the inner tube, with the thermocouple junction at the desired locations along the tube length. The cable and junction are held in position by, for example, laser welding a group of spots on either side of the cable. The laser welding fuses and thereby coalesces the thermocouple or the thermocouple sheath material into that of the tube in an area of about 0.015 inch diameter. The filler wires 35 are then positioned as shown and can also be laser welded into place.

The inner conduit with thermocouple is next assembled within the outer conduit in a clearance fit. The assembled tubes are mechanically reduced in diameter to produce an interference fit between the inner and outer tubes. This is performed by drawing the tubes through a die to effect a reduction of, for instance, 0.020 inch on a 0.5 inch diameter tube. The drawing operation is facilitated if the ends opposite that of the thermocouple's entrance include excess length for pulling the tube assembly through the die. A reduction of this type can be performed at ambient temperature and, if necessary, several passes through the die can be made. After the reduction is made, the excess length of the tube is removed.

In assembling sheath 11 as part of an electric heater, terminals 15 and 17 along with the electrical resistance element 13 are arranged in place with a temporary seal at one end of the sheath. The inner compartment of sheath 11 around the resistance element and terminals is filled with a dried electrically insulative and heat conductive material 23 such as magnesium oxide or boron nitride in particulate or powder form. To insure the electrical insulative character of this material, the heater is then baked at about 700°F. for several hours. Following the drying step, moisture seal 21 is installed around terminal 17 and pressed into the end of the sheath. Since the thermocouple leads are within the walls of composite sheath 11, moisture seal 21 can be tightly fitted between the terminal and inner wall of the sheath without damaging the thermocouples.

In the final steps of assembling the electric heater, the diameter of sheath 11 is further reduced to specifications. For example, a swaging operation can be used to reduce a 0.5 inch O.D. tube by about 0.08 inch. This completes the mechanical bonding of the inner and outer tubes 25 and 27 as well as the compaction of electrical insulative material 23. The remaining temporary moisture seal is then removed and ground plug 19 welded into place around terminal 15 and at shoulder 41 to seal the sheath.

Turning now to FIG. 3, an alternate construction of the thermocouple installation and sheath is shown. An outer tube 51 is formed with internal concave creases 53 throughout its length. Creases 53 can be formed as before except that the tube is drawn over outward protrusions on an internally disposed die portion. Thermocouple cables 55 are positioned within the creases with the thermocouple junctions 57 located at the desired spot along the tube's length. Since it is difficult to weld onto the internal surface of the tube, the cables are fitted into the creases and only the thermocouple junction welded to the I.D. of the tube. The outer tube 51 with the thermocouples installed is assembled over an inner tube 59 in a clearance fit. The assembly is mechanically reduced as before in a drawing operation to squeeze the outer tube into an interference fit with the inner tube. The integral composite sheath as thus formed can be assembled with the other components to form an electrical heater as described above.

Where it is desired to form a relatively large interstice within the sheath wall, both the inner and outer tubes can be creased. FIG. 4 illustrates a thermocouple cable 61 disposed in an interstice 67 formed by aligning longitudinal creases within an outer tube 63 and an inner tube 65. The thermocouple cables 61 and the thermocouple junctions can be fixedly positioned in respect to the sheath length by either the methods described in conjunction with FIG. 1 or FIG. 3. The cables can either be welded into the external creases within tube 65 or fitted into the internal creases of tube 63 followed by the assembly and mechanical reduction of the two tubes into an integral, composite sheath.

In FIG. 5, a heat flux monitor 70 is illustrated within a groove or interstice 81 formed between an inner tube 83 and an outer tube 85 in the manner described in conjunction with FIGS. 1 and 2. Monitor 70 comprises an outer jacket 71 of for instance stainless steel, enclosing two wires 73 embedded lengthwise in electrical insulation 75. Unlike the dissimilar conductors within a thermocouple cable, wires 73 are of the same composition, but that composition is one such as Chromel that is suitable for use as one conductor within a thermocouple pair. One end of monitor 70 is covered with a metal portion or weld filler 77 of a dissimilar composition such as constantan. The weld filler is bonded to both of wires 73 to form two opposing thermocouple junctions 74. Markings 79 are placed on the jacket 71 of the heat flux monitor 70 to align wires 73 at different distances from the coinciding axes of tubes 83 and 85. Preferably, wires 73 are positioned perpendicular to a common radius from these axes. The thermocouples will generate an electrical potential in respect to a cold junction within wires 73 representative of the differences in temperature between the two junctions 74. Since heat flux is proportional to temperature differences, the heat flux monitor can be calibrated in terms of heat flow and thereafter used to estimate the heat transferred through a heater sheath or other process sheath.

Although the present invention has been described in conjunction with a few specific embodiments, it will be understood that various modifications can be made within the scope of the invention. For example, the composite sheath as described can be employed with other process devices than merely an electric heater. An actual nuclear fuel element containing fissionable fuel or a radioisotopic fuel element could be monitored by a sheath of this construction. Other types of instrumentation than those illustrated can be used within the sheath. For temperature instrumentation, a resistance thermometer as well as a heat flux detector or thermocouple could be employed. In other types of instrumentation, piezoelectric, eddy current, strain-gauge or pressure pickup types of devices might be housed within the sheath wall for sensing mechanical deflection, strain and pressure.

It will be seen that the present invention provides a sheath for protectively containing instrumentation at a known location in respect to a process. The instrumentation can measure temperature or other process variables. Such a sheath can be made a part of a simulated nuclear fuel element containing an electrical resistance element for generating heat. The accurately positioned temperature instrumentation allows temperature profiles to be constructed for various simulated operating modes of the nuclear fuel element. The invention also provides a method of accurately positioning the instrumentation within the sheath with reduced risk of damage or movement during assembly.

The embodiments of the invention in which an exclusive property or privilege is claimed are defined as follows:

1. In an electrical heater for use as a simulated nuclear fuel element having a tubular metallic sheath, an electrical resistance element in generally axial alignment within said sheath, with electrical terminals extending outwardly endwise in sealing relationship from said sheath and an electrically insulative material disposed between said electrical resistance element and said sheath, the improvement wherein said sheath comprises a first tube having a longitudinal crease with a concave and a convex face; a second tube disposed towards said concave face in interfering concentric engagement with said first tube to form an integral sheath having within the wall thereof a longitudinal interstice; a thermocouple assembly including a pair of elongated electrical conductors and a thermocouple junction at one end thereof fixedly disposed within said interstice, said assembly and interstice having cross sections of near matching dimensions to provide contact of both said first and said second tubes with said assembly and to restrict movement of said thermocouple junction within said assembly.

2. The electrical heater of claim 1 wherein there is included metallic filler material fixedly disposed within said interstice alongside and in extension of said thermocouple assembly to fill remaining voids in said interstice.

3. The electrical heater of claim 1 wherein said first tube having said longitudinal crease is disposed in concentric engagement within said second tube.

4. The electrical heater of claim 1 wherein said first tube having said longitudinal crease is disposed in concentric engagement outside said second tube.

5. The electrical heater of claim 1 wherein a longitudinal crease having a concave face is included within both said first and said second tubes, said concave face within said second tube is disposed in facing, coextensive alignment with said concave face of said first tube to form a longitudinal interstice containing said thermocouple assembly between said tubes.

6. The electrical heater of claim 1 wherein said thermocouple assembly comprises an elongated cable with two conductors of the same metal, said conductors being interconnected by a dissimilar metal portion to form two opposing thermocouple junctions at the interfaces of said conductors and said dissimilar metal portion, said conductors being aligned perpendicular to a common radius of said heater sheath and said two thermocouple junctions being disposed along said common radius to monitor heat flow between said junctions.

* * * * *